United States Patent [19]

Nonomiya et al.

[11] Patent Number: 4,662,274
[45] Date of Patent: May 5, 1987

[54] RICE-HULLING ROLLER

[75] Inventors: Kojiro Nonomiya; Satoru Sakuma, both of Miki, Japan

[73] Assignee: Bando Kagaku Kabushiki Kaisha, Kobe, Japan

[21] Appl. No.: 723,257

[22] Filed: Apr. 15, 1985

[30] Foreign Application Priority Data

Jan. 18, 1985 [JP] Japan ................................ 60-008046

[51] Int. Cl.$^4$ .............................................. B02B 3/04
[52] U.S. Cl. .................................... 99/620; 29/121.1; 29/132; 99/617; 99/622
[58] Field of Search .................................... 99/617–622, 99/600, 518, 574, 575; 241/277, 278 R, 7; 100/176, 155 R; 29/132, 121.1, 121.6, 121.7

[56] References Cited

U.S. PATENT DOCUMENTS 3,324,916  6/1967  Saeki .
3,613,200  10/1971 Meyer .
3,718,959  3/1973  Sailas .
4,066,012  1/1978  Satake et al. ..................... 99/622 X
4,194,445  3/1980  Gemsjager ........................... 99/618
4,368,568  1/1983  Watanabe ......................... 29/132 X

FOREIGN PATENT DOCUMENTS 65111    of 1914  Austria .
70681    8/1893   Fed. Rep. of Germany .
67847    7/1969   Fed. Rep. of Germany .
1575492  7/1970   Fed. Rep. of Germany .
1398585  6/1975   United Kingdom .

Primary Examiner—Timothy F. Simone
Attorney, Agent, or Firm—Marshall, O'Toole, Gerstein, Murray & Bicknell

[57] ABSTRACT

This disclosure relates to the structure of a roller for hulling rice. The roller comprises a core including a cylinder, a boss section on the interior of the cylinder, and a rubber layer provided on the outer circumference of the cylinder. The cylinder is corrugated and includes alternating furrows and ridges in the axial direction thereof.

11 Claims, 7 Drawing Figures

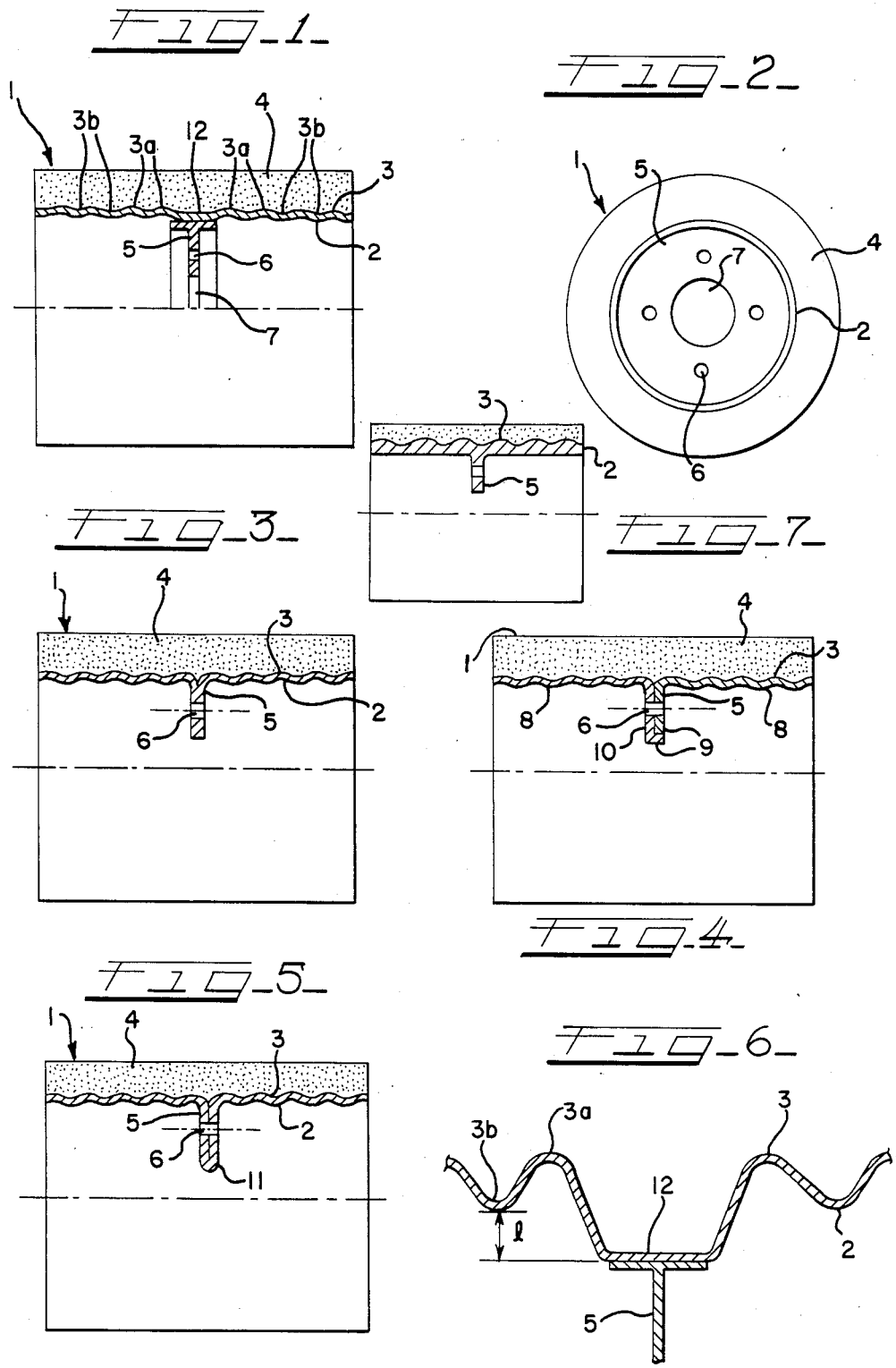

RICE-HULLING ROLLER

FIELD AND BACKGROUND OF THE INVENTION

The present invention relates to rice-hulling rollers of the type including a cylindrical core or drum and a layer of abrasion-resistant elastomer or the like provided on the outer surface of the core.

A rice-hulling roller usually includes a core (or drum) comprising a metal cylinder and a boss section for supporting the cylinder on a machine, and an abrasion-resistant elastomer layer on the outer circumference of the cylindrical core. Such rice-hulling rollers may be roughly classified as follows:

A. Those having a rigid structure
  (a) Having an integral core structure (casting, etc.); or
  (b) Having a core made of iron plate;
B. Those having a Flexible structure
  (c) Having a core made of iron plate, with a resilient coupling between the cylinder and the boss section.

Rice-hulling rollers of the foregoing character have the following disadvantages:

1. A roller having a core formed by a casting (construction a) is heavy and requires a large driving force, and the load is large.

2. Since a cast core is not formed accurately and its dynamic balance is not good, the machine will be adversely affected and will generate excessive vibration and noise. Further, such a roller is brittle and is vulnerable to cracking due to impact during handling, and also cracking due to intrusion of foreign matter during hulling operation.

3. On the other hand, castings made of aluminum may be lighter in weight and have good dynamic balance. The aluminum rollers, however, still have a rigid construction, and the machine is directly affected by an intrusion of a foreign matter, resulting in frequent maintenance of the machine.

4. A roller having a core made of iron plate (construction b) is made from plate which has formed by deep drawing, curling, and welding, and accordingly its formed accuracy is low, with insufficient circularity and excessive runout. Its dynamic balance, in turn, is poor and excessive vibration is generated. When a foreign matter is fed into the machine, the drum circumference tends to be deformed and not easily restored to its original shape.

5. In the case of a flexible roller (construction c), while the shock absorption is improved, buckling tends to occur in the resilient layer, resulting in excessive noise. Further, the resilient layer tends to be broken when an excessive load is applied to the roller, and the durability of the roller is inadequate.

It is a general object of the present invention to avoid the above-mentioned disadvantages and to provide a rice-hulling roller which does not vibrate and has an excellent durability whereby the core is unlikely to crack even if foreign matter is fed into the machine.

BRIEF SUMMARY OF THE INVENTION

Apparatus in accordance with the present invention comprises a core including a cylinder, a boss section on the interior of the cylinder, and a rubber layer provided on the outer circumference of said cylinder. The cylinder is corrugated and includes alternating furrows and ridges in the axial direction thereof.

BRIEF DESCRIPTION OF THE DRAWINGS

The present invention will be better understood from the following detailed description taken in conjunction with the accompanying figures of the drawings, in which:

FIG. 1 is a view partially in section of one embodiment of a rice-hulling roller in accordance with the present invention;

FIG. 2 is an end view of the roller shown in FIG. 1; and

FIGS. 3-7 are views similar to FIG. 1 but showing alternate embodiments of the rice-hulling roller.

DETAILED DESCRIPTION OF THE DRAWINGS

In FIGS. 1 and 2, a rice-hulling roller 1 in accordance with the invention comprises a tubular cylinder 2 that is corrugated in the axial direction. The corrugations 3 form series of alternating annular ridges 3a and furrows 3b along substantially the length of the cylinder. Numeral 4 indicates a tubular layer of abrasion-resistant elastomer or the like provided on the outer circumference of the cylinder 2. Numeral 5 indicates a boss section secured to the interior surface of the cylinder at approximately its center in the axial direction thereof. The numeral 6 stands for mounting bolt holes for securing the boss section 5 to a mounting flange (not illustrated) of a hulling machine with bolts, the mounting flange being fastened to a drive shaft of the machine (not illustrated). The numeral 7 indicates a central boss hole in which the mounting flange is located. The hulling machine, drive shaft and flange may have a conventional construction. The embodiment illustrated is one wherein the boss section 5 has an outer diameter which is close to the inner diameter of the cylinder.

As for the constituent materials of the cylinder 2 and the boss section, either metal or plastics may be used. Where metal is used, these parts may be welded together. The shape of the corrugations of the cylinder 2 may be of any continuous or discontinuous wave shape such as sine curve, approximate sine curve, pulse or trapezoid, and such waves may be formed over all of the cylinder in the axial direction except for the area of engagement and weld with the boss piece 5 (as shown in FIG. 1) or over the entire length (in this case, spot welding is used between the boss and the cylinder).

The experimentally-determined preferred pitch of the corrugations (for example from the top of one ridge to the top of the next adjacent ridge) is approximately 5-25 mm (for a roller having a shorter overall length, a wave pitch of more than 25 mm results in reduced flexibility), height (i.e., from the bottom of a furrow to the top of a ridge) of the wave is approximately 0.2-5 mm (a height of less than approximately 0.2 mm produces little flexibility, and that of more than approximately 5 mm tends to produce air pockets in the furrows of the waves when the layer 4 and the corrugated cylinder 2 are joined together, the pockets preventing adhesion; further, due to the restrictions on the mounting dimensions of the rice-hulling machine, approximately 5 mm is a maximum limit for securing sufficient thickness of the layer 2 and at the same time a sufficient service life of the roller and stable quality of husked rice); the gap, if any, between the bottom of the furrow and the outer surface of the boss section of approximately 0-5 mm (a gap of more than approximately 5 mm tends to generate air pockets in the central valley 12 (see FIGS. 1 and 6) of the cylinder 2 when the layer 4 and the cylinder 2 are joined together and prevent adhesion, further, it results in inconvenience in mounting the roller in the machine due to restrictions of the mounting dimensions of the hulling machine); the thickness of the constituent material forming the cylinder of approximately 1.0-3.0 mm (a thickness of less than approximately 1.0 mm may give insufficient strength, and a thickness of more than approximately 3.0 mm increases the weight and hinders lighter construction). Both ends of the cylinder may be curled or turned over to produce a more rigid construction.

EXAMPLE OF MANUFACTURE

An example of the manufacture of the above-described construction of the rice-hulling roller is described as follows:

(I) First, the cylinder 2 is produced:

A piece of iron plate of the required dimensions is cut out, and formed into a cylinder (as by bending). Next, the adjoining axially extending edges are welded together. Corrugations are then formed by expanding or external drawing and the circularity of the cylinder is corrected. Instead, the cylinder may be produced by first cutting out a piece of iron plate, forming the corrugations, then forming the piece into a cylinder, welding the adjoining edges together, and correcting the circularity by expanding or external drawing.

(II) Next, the boss section 5 is produced;

An annular iron piece of the required dimensions is cut out. Next, the rim is formed by slitting and bending the outer section.

(III) The boss section 5 is engaged with and welded to the interior surface of the cylinder 2 at the approximate center in the axial direction of the cylinder.

(IV) The outer layer 4 is then formed on the outer surface of the cylinder 2 as by molding the rubber or synthetic material.

The same reference numerals are used in the various embodiments of the invention to indicate corresponding parts.

FIG. 3 illustrates an alternate form of a rice-hulling roller including a core formed by a cylinder 2 from which a boss section 5 of the same material is formed integrally as by a slitting operation. The cylinder 2 includes corrugations 3 in the axial direction similar to FIG. 1, and a cover layer 4 is provided over the circumference of the cylinder 2. In this construction, since the boss is formed integrally with the cylinder, there are no joints or connections and accordingly the accuracy of the core is good and its dynamic balance is excellent. Further, the weight of the roller may be reduced, together with the production cost.

In the embodiment shown in FIG. 4, a rice-hulling roller is shown wherein the core is formed by preparing two cup-shaped pieces, each of which includes a cylindrical section 8 with corrugations 3, and a boss section 9 which is formed integrally with the cylindrical section 8. The bottoms of the two boss sections 9 are positioned against each other and secured together as by welding to form a united part 10. A cover layer 4 is provided over the circumference of the joined sections 8. This construction has the merit that the roller can be produced at a relatively small-sized and inexpensive production facility because the roller can be made one-half piece at a time.

The rice-hulling roller shown in FIG. 5 includes a cylinder 2 which is deep-drawn at its approximate center in the axial direction to form an integral boss section 5 of the same material as the cylinder 2 (the deep-drawn portion is indicated by the numeral 11). A cover layer 4 is provided over the circumference of the cylinder 2 which has corrugations 3 as previously described. This construction has the merits of relatively good precision, excellent dynamic balance, and lighter construction, since it is free of joints or connections between the cylinder and the boss.

FIG. 6 illustrates a construction which is similar to FIG. 1 but wherein an indentation or gap 12 is provided at the portion of the cylinder 2 which is secured to the boss 5. This gap 12 has a distance 1 below the bottom of the furrows 3b. This construction also includes a cover layer (not shown in FIG. 6) which is similar to that of FIG. 1 and fills the gap 12.

When operating a rice-hulling roller constructed in accordance with the present invention, because of the corrugations on the cylinder, which is the main component of the core, the cylinder has a greater area of elastic deflection caused by an external force exerted on the surface of the cylinder. In other words, the cylinder has a flexible construction, and at the same time, it is endowed with an appropriate rigidity (rigidity acting to maintain the cylindrical form). Accordingly, even when a foreign object is fed into the rollers during rice-hulling operation, the cylinders are not dented, and maintain the power of restitution. In particular, when a gap is provided at the connecting joint between the inner surface of the cylinder and the boss section, the effects of the above-mentioned flexible construction become more conspicuous.

A test has been made to compare the performance of the rice-hulling roller according to the present invention with conventional rice-hulling rollers (in the following table, 1 is a core made of casting; 2 is a core made of iron plate; 3 is a core made of iron plate and a flexible coupling is provided as a cushioning material at the joint between the cylinder and the boss section) under the same conditions; the performance of the rollers was examined in terms of noise (sound pressure) level (dB (A)), hull removal ratio (%), kernel surface damage ratio (%), broken rice ratio (%), electric current (A) of the motor driving the roller, and dynamic balance (mm/sec). The results are shown in the following table:

|  | Present Invention | (1)Cast Core | (2)Iron Plate Core | (3)Iron Plate & Flexible Coupling |
| --- | --- | --- | --- | --- |
| Noise (db (A)) | 86 | 89 | 89 | 87 |
| Hull removal (%) | 88 | 87 | 87 | 86 |
| Kernel damage (%) | 10.5 | 12.2 | 14.7 | 11.4 |
| Broken rice (%) | 0.07 | 0.08 | 0.11 | 0.08 |
| Current (A) | 21 | 23 | 23 | 27 |
| Dynamic balance (mm/sec) | 12 | 29 | 36 | 27 |

As clearly indicated by the results shown in the table on the previous page, the roller of the present invention excelled the conventional rice-hulling rollers in every test category.

In the constructions shown in FIGS. 1 to 6, the cylinder 2 of the roller has a substantially constant thickness and the corrugations appear on both its inner and outer peripheries. FIG. 7 illustrates a construction which is somewhat similar to FIG. 3 wherein a core is formed by a cylinder 2 from which a boss section 5 is formed integrally as by a slitting operation. In the roller shown in FIG. 7, on the other hand, the cylinder 2 has corrugations 3 only on its outer surface and its inner surface is flat. This construction shown in FIG. 7 facilitates the production of the roller, and the circularity of the core is maintained similarly to the construction shown in FIG. 3.

A rice-hulling roller according to the present invention, having the construction and operation described herein, exhibits the following effects:

(1) The rice-hulling roller has a good dynamic balance because of the flexible construction afforded by the corrugations on the cylinder of the core, has controlled transmission of vibration to the boss section due to the gap between the cylinder and the engaging joint, is light weight, and has excellent circularity.

(2) Like the preceding item, the roller of the present invention shows a higher ratio of hull removal because the holding of hulls is improved by the flexible construction and the good dynamic balance. Further, as the flexible construction reduces excessive shearing forces, the kernel surface damage ratio and the broken rice ratio are lowered.

(3) As excessive shearing forces are avoided, hulling can be achieved with a smaller drive power or electric current to the drive motor; together with good dynamic balance, this makes it possible to lessen the power consumption.

(4) The core of the rice-hulling roller is normally improved in circularity and runout by expanding and external drawing, has good dynamic balance, and the level of vibration or noise is very low.

(5) Since the cylinder has a flexible construction, the cylinder is free of local damages as well as stress concentration, and, in turn, it does not experience fatigue failure.

What is claimed is:

1. A rice-hulling roller comprising a core including a hollow, relatively thin-walled cylinder and a boss section on the interior of said cylinder, and a resilient cover layer fastened to the outer circumference of said cylinder, said cylinder including corrugations in the axial direction thereof, said corrugations forming alternating furrows and ridges on said outer circumference of said cylinder, said cover layer extending into and filling said furrows and ridges and thereby having different radial thicknesses.

2. A rice-hulling roller as claimed in claim 1, wherein said boss section has an outer diameter which is substantially the same as the inner diameter of said cylinder, said boss section including an engaging portion which is joined to said cylinder at approximately the center in the axial direction of said cylinder.

3. A rice-hulling roller as claimed in claim 2, wherein a gap is provided between the inner diameter of said corrugations of said cylinder and said engaging portion of said boss section.

4. A rice-hulling roller as claimed in claim 2, wherein said corrugations of said cylinder are provided over substantially the full length of said cylinder in its axial direction.

5. A rice-hulling roller as claimed in claim 2, wherein said corrugations of said cylinder are provided over the length of said cylinder in its axial direction except where said cylinder is joined with said boss section.

6. A rice-hulling roller as claimed in claim 1, wherein said cylinder and said boss section are integrally formed.

7. A rice-hulling roller as claimed in claim 1, wherein said cylinder and said boss section are comprised of two cup-shaped half pieces, each half piece including a bottom portion and a corrugated cylindrical portion, said bottom portions being joined to form said boss section.

8. A rice-hulling roller as claimed in claim 1, wherein the boss section is integrally formed with said cylinder by deep drawing of said cylinder at its approximate center in the axial direction thereof.

9. A rice-hulling roller according to claim 1, wherein said cylinder is corrugated on both its inner and outer surfaces.

10. A rice-hulling roller according to claim 1, wherein said cylinder is corrugated on its outer surface and is substantially flat on its inner surface.

11. A rice-hulling roller comprising a hollow, relatively thin-walled cylinder having an axis, substantially annular corrugations in the axial direction on said cylinder, said corrugations forming axially spaced, alternating furrows and ridges, a boss connected to said cylinder on the interior thereof, and a resilient cover layer attached to the exterior of said cylinder, said layer extending into and filling said furrows and thereby having different radial thicknesses.

* * * * *